United States Patent [19]

Herman et al.

[11] Patent Number: 5,087,155
[45] Date of Patent: Feb. 11, 1992

[54] APPARATUS FOR INTRODUCING BULK MATERIALS INTO PNEUMATIC CONVEYING LINE

[75] Inventors: Alvin Herman; Rubien Herman; Ken Bokor, all of Saskatchewan, Canada

[73] Assignee: Blowhard Pneumatic Services Inc., Saskatchewan, Canada

[21] Appl. No.: 514,757

[22] Filed: Apr. 25, 1990

[51] Int. Cl.⁵ .............................................. B65G 53/08
[52] U.S. Cl. ................................................ 406/61; 406/57
[58] Field of Search .................. 406/53, 56, 60, 57, 406/61, 145

[56] References Cited

U.S. PATENT DOCUMENTS

| | | | |
|---|---|---|---|
| 190,357 | 5/1877 | Palmer | 137/527.8 |
| 560,381 | 5/1886 | Wainwright et al. | 406/60 |
| 875,225 | 12/1907 | Vraalstad | 406/56 |
| 1,705,362 | 3/1929 | Helm | 137/527.6 |
| 1,924,675 | 8/1933 | Bernert | 406/60 |
| 3,103,276 | 9/1963 | Schmitzer . | |
| 3,106,428 | 10/1963 | Lenhart | 406/60 |
| 3,460,869 | 8/1969 | Herr | 406/60 |
| 3,588,180 | 6/1971 | Herr | 406/60 |
| 3,876,261 | 2/1975 | Jucius, Jr. et al. | 406/145 |
| 4,114,785 | 9/1978 | Dugge | 406/153 |
| 4,152,029 | 5/1979 | Cowpertwait | 406/58 |
| 4,160,567 | 7/1979 | Merz | 406/89 |
| 4,279,556 | 7/1981 | Ronning | 406/53 |
| 4,615,647 | 10/1986 | Lukacz . | |

FOREIGN PATENT DOCUMENTS

| | | |
|---|---|---|
| 983423 | 2/1976 | Canada . |
| 1119993 | 3/1982 | Canada . |
| 094811 | 11/1983 | European Pat. Off. ............ 406/53 |
| 224330 | 6/1987 | European Pat. Off. . |
| 876078 | 5/1953 | Fed. Rep. of Germany . |
| 1756648 | 4/1970 | Fed. Rep. of Germany . |
| 683398 | 6/1930 | France . |
| 1066286 | 4/1967 | United Kingdom . |
| 1462786 | 1/1977 | United Kingdom . |

Primary Examiner—Joseph F. Peters, Jr.
Assistant Examiner—Virna Lissi Mojica
Attorney, Agent, or Firm—Killworth, Gottman, Hagan & Schaeff

[57] ABSTRACT

A portable pneumatic conveyor for various bulk materials includes a hopper which supplies the bulk material to a feed tube. The feed tube is provided with a feed auger which advances the bulk material along the feed tube and into a chamber through which a current of air is passed by way of air inlet and air outlet lines connected to that chamber. The bulk material which is deposited within the chamber is fluidized by the air current and carried by the air current through the air line outlet and along the outlet conveying line to a storage site, such as a silo. In order to prevent air blowback through the feed tube and alongside the auger, the outlet end of the feed tube is provided with a gate which is intended to at least partly close when the flow of bulk material into the chamber slows down or stops.

23 Claims, 4 Drawing Sheets

APPARATUS FOR INTRODUCING BULK MATERIALS INTO PNEUMATIC CONVEYING LINE

BACKGROUND OF THE INVENTION

This invention relates to the pneumatic conveyance of materials and, in particular, to improved apparatus for introducing fluent bulk materials into a pneumatic conveying line.

In the pneumatic conveyance of various bulk materials it is well known to provide a hopper or similar collecting arrangement which supplies the bulk material to a feed tube. The feed tube in turn is provided with a suitable means, such as a feed auger, which advances the bulk material along the feeding tube and into some form of chamber through which a current of air is passed by way of air inlet and air outlet lines connected to that chamber. The bulk material which is deposited within the chamber is intended to be fluidized by the air current and carried by the air current through the air line outlet and along the outlet conveying line to a storage site, such as a silo.

In order to prevent air blow-back through the feed tube and alongside the auger, the outlet end of the feed tube is provided with a gate or other suitable one way valve arrangement which is intended to close when the flow of bulk material into the chamber slows down or stops thereby to prevent air blow-back through the feed tube and feed hopper. If blow-back occurs, the bulk material being handled may be sprayed around thus creating a potential hazard and, at least, a substantial cleanup problem.

The prior art has provided various devices of the nature indicated above as exemplified generally by the following U.S. Pat. Nos.:

| | |
|---|---|
| 560,381 - Wainwright et al | May 19, 1896 |
| 3,106,428 - Lenhart | Oct. 8, 1963 |
| 3,460,869 - Herr | Aug. 12, 1969 |
| 3,588,180 - Herr | June 28, 1971 |

One notable problem with all or virtually all of the prior art devices is that they were prone to a build-up of the material on or adjacent to the movable gate. After a period of time the gate would not close properly thus creating a substantial blow-back problem. Many of the prior art units were also prone to plugging thus requiring substantial down-time to partially dismantle the device and to remove the plugged up material.

Part of the problem with many of the prior art designs is that the internal configuration in the region of the gate is such that inadequate fluidization of many materials does not take place thus resulting in the build-up of deposits which eventually render the apparatus inoperative. In addition, no means were provided whereby the operator could observe the action occurring in the vicinity of the gate and take appropriate remedial action before plugging or blow-back occurred.

Another problem inherent in many or all of the prior art devices is that they are not sufficiently versatile. Most of them were designed for either only one or a very small number of very similar products. If an attempt is made to use them with products having substantially different characteristics, problems resulting from gate deposit build-up, plugging, and blow-back back soon arise.

Another problem inherent in most, if not all, of the prior art devices of the type under consideration is that they are only intended to be used in one fixed location. This necessitates the use of highly specialized and relatively expensive equipment for transporting dry bulk materials. In the past these dry bulk materials have been transported by pneumatic trailers and a relatively small number of specially designed rail cars. In the case of the so-called pneumatic trailers (which are intended for highway use), the entire vessel or container is pressurized during the unloading operation and this necessitates an extremely expensive structure. This, in turn, tends to increase shipping costs. Because of the specialized nature of the container, the pneumatic trailer is generally only usable one way thus meaning that the return trip is made with no load. This again keeps shipping costs high. Various fluent bulk materials, such as cement, lime, sand, salt and various dry chemicals, are commonly carried in this fashion.

SUMMARY OF THE INVENTION

It is a general objective of the present invention to alleviate or overcome the various difficulties noted above and to provide apparatus for successfully introducing a wide variety of fluent bulk materials into a pneumatic conveying line and which is substantially free from the plugging and blow-back problems inherent in the prior art devices.

A further objective is to provide apparatus of the type under consideration wherein the operator can readily observe the action occurring in the vicinity of the gate and take remedial action so as to increase or decrease the rate of flow of the bulk material thereby to provide optimum performance.

A further objective of the invention is to provide apparatus of the type under consideration which is readily portable from one job site to another and which is of a relatively low-profile configuration so that it can be slipped under a conventional hopper bottom trailer so as to receive the bulk material from it thus enabling use of the much less expensive hopper bottom trailers, which trailers can carry a load both ways, thus substantially reducing overall shipping costs.

A further object of the invention is to provide apparatus of the type under consideration which is capable of successfully handling a very wide variety of fluent bulk materials, all the way from very light and relatively easily handled materials such as flour right through to the more difficult materials such as cement, lime, salt and the like.

Accordingly, the present invention in one aspect relates to apparatus for introducing fluent bulk materials into a pneumatic conveying line, comprising:

(a) a fluidizing chamber having an air line inlet and an air line outlet for connection to incoming and outgoing air lines respectively;

(b) a feed tube connected to the fluidizing chamber, and having an outlet end disposed within said chamber;

(c) an assembly for effecting movement of the bulk material through said feed tube from a source of supply into the interior of the fluidizing chamber so that the material may, during use, be fluidized by an air flow passing through the fluidizing chamber from said air line inlet to and through said air line outlet and carried therewith out through the air line outlet;

(d) a gate located at said outlet end of said feed tube within the fluidizing chamber and exposed, in use, to the air flow passing from the air line inlet to and through the air line outlet and responsive to opposing forces exerted, thereon by the bulk material moving through the feed tube and the pressure of the air within the fluidizing chamber for permitting flow of said bulk material into said fluidizing chamber through the feed tube and at the same time preventing blow back of air from the fluidizing chamber through said feed tube.

In accordance with an aspect of the invention, the air line inlet and the air line outlet noted above are located in substantial alignment with one another along a first axis. The feed tube defines a further axis which is laterally arranged relative to the first axis and is displaced from it in such a way that, during use, bulk material exiting the outlet end of the feed tube falls downwardly under the influence of gravity and passes into and is fluidized by the air flow passing through the fluidizing chamber along the first axis from the air line inlet to the air line outlet.

Preferably and in accordance with another aspect of the invention, the gate is hinged adjacent its upper edge for movement from a closed position in close contacting relation to the outlet end of the feed tube to and through a range of partially open positions. During use, the bulk material applies a force to one face of the gate while the pressure of the air applies a force to the opposing face of the gate.

In a preferred form of the invention, the fluidizing chamber includes a gate chamber and an air duct section. The air duct section typically includes a tubular section having the air line inlet and the air line outlet disposed at opposing ends thereof. The gate chamber is secured to the air duct section and has its lower end portion opening into and freely communicating with the interior of the duct section. As a result of this construction, the bulk materials falling downwardly by gravity from the outlet end of the feed tube pass into a central region of maximum air flow velocity within the air duct section to effect substantially complete fluidization of the bulk material.

Still further according to a feature of the invention, the above-noted gate is disposed in the fluidizing chamber such that, during use, a substantial lower portion Of the gate is disposed within the region of maximum air flow velocity so that the resulting air currents tend to keep the gate clear of deposits which might otherwise tend to prevent full closure of the gate.

In a preferred form of the invention, the above-noted assembly for effecting movement of the bulk material through the feed tube includes a variable speed drive and suitable means to control this drive. The control means preferably includes start, stop and reverse valve means for controlling the movement of material through the feed tube. This facilitates safe operation and allows the safe removal of certain foreign materials that may from time to time become lodged in the feed tube. The fluidizing chamber is typically provided with a viewing port above the gate so that the operator can control the rate of movement of material through the feed tube by way of a speed control valve in accordance with conditions as observed within the fluidizing chamber. All of this permits remedial action to be taken before a plugging situation occurs.

As a further desirable feature of the invention, a low profile inlet hopper is connected to an inlet end of the feed tube. This low profile hopper allows the apparatus to be located below and to receive bulk material from the outlet of a hopper bottom trailer or the like.

Inlet flow control means are typically provided in the hopper to control the rate of flow of bulk material into the feed tube and the device for effecting movement of the bulk material through the feed tube. The device for effecting such movement is typically a feed screw, otherwise known as a feed auger.

The above-noted means (e.g. the feed auger) for effecting movement of the bulk material through the feed tube is located in a lower portion of the hopper. The inlet flow control means is typically disposed just above the previously noted means (e.g. feed auger) and may take the form of an inverted V-shaped baffle having suitable means thereon such as adjustable plates arranged to allow the rate of flow of material from the hopper toward and into the feed tube to be varied as desired.

Further features, objects and advantages of the present invention will become apparent to those skilled in the art after reading the following description of a preferred embodiment of the invention taken in conjunction with the appended drawings.

DETAILED DESCRIPTION OF THE PREFERRED EMBODIMENT

Referring now to the drawings there is shown a preferred form of the apparatus for introducing the fluent bulk materials into the pneumatic conveying line, such apparatus being generally designated by reference numeral 10. The apparatus includes a low-profile hopper 12 which is mounted adjacent one end of an elongated feed tube 14. Feed tube 14 is connected to and enters into a fluidizing chamber 16. The fluidizing chamber 16 is provided with a flow of pressurized air from a suitable blower, preferably a positive displacement lobe blower (not shown), by way of an inlet air line 18 (shown in dotted lines), and the suspended or fluidized bulk material-air mixture leaves via air outlet line 20 (also shown in dotted lines) and is transported thereby to a suitable storage means such as a silo (not shown).

The above-noted infeed hopper 12 is provided with four shallowly sloping walls 22, the lower edges of which are secured, as by welding, to the wall of the feed tube 14. The overall height of the apparatus is preferably kept to about 12 inches so that the hopper end of the apparatus may be slid beneath a hopper bottom trailer and the hopper 12 positioned below an outlet port.

Figure 4:
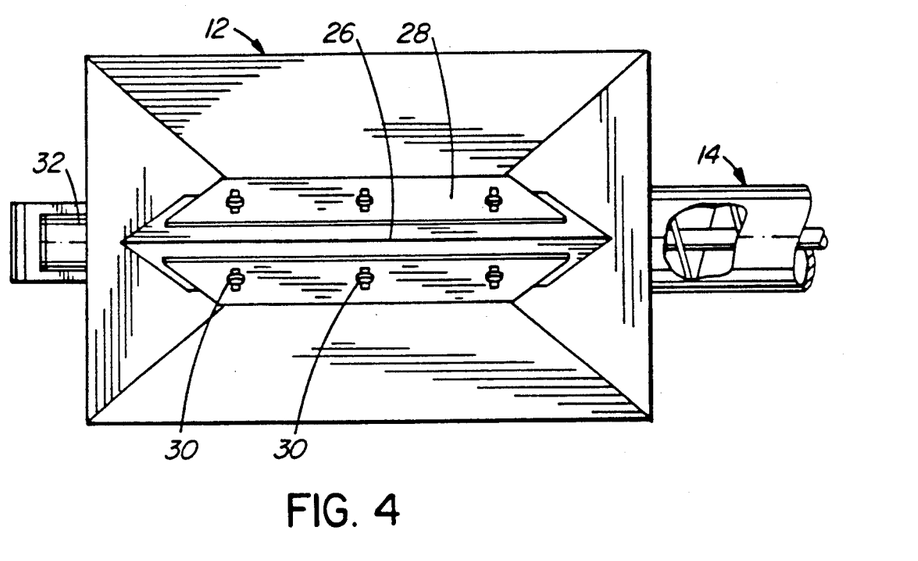
FIG. 4 is a top plan view of the hopper with the flow control assembly in place above the feed auger.

In order to control the flow of bulk material from the interior of hopper 12 into a feed auger 24 which extends within the feed tube 14, there is provided an inverted V-shaped baffle 26 which extends between and is welded to the opposing end walls 22 of the hopper. This baffle 26 is provided with an opposed pair of adjustment plates 28 which may each be slid upwardly or downwardly in the direction of arrows A thereby to increase or decrease the size of the gap existing between the lower edge of the respective adjustment plate and the adjacent hopper wall 22. These adjustment plates are secured to baffle 26 via a multiplicity of bolts 30 which extend through suitable slots in the adjustment plates 28 thereby to allow the plates 28 to be firmly secured in the desired adjusted positions.

Figure 1:
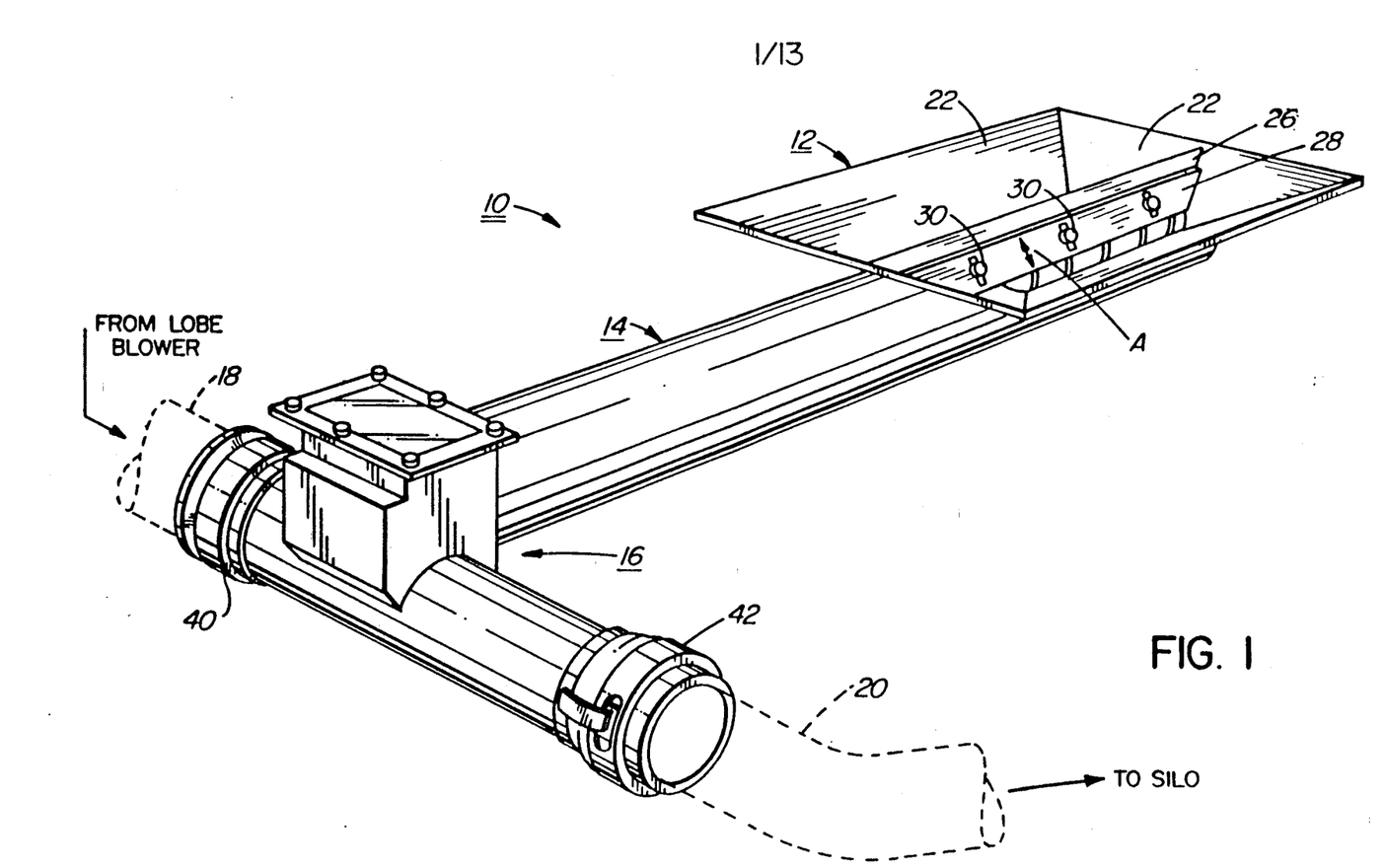
FIG. 1 is a perspective view of an apparatus for introducing fluent bulk materials into a pneumatic conveying line.
Figure 2:
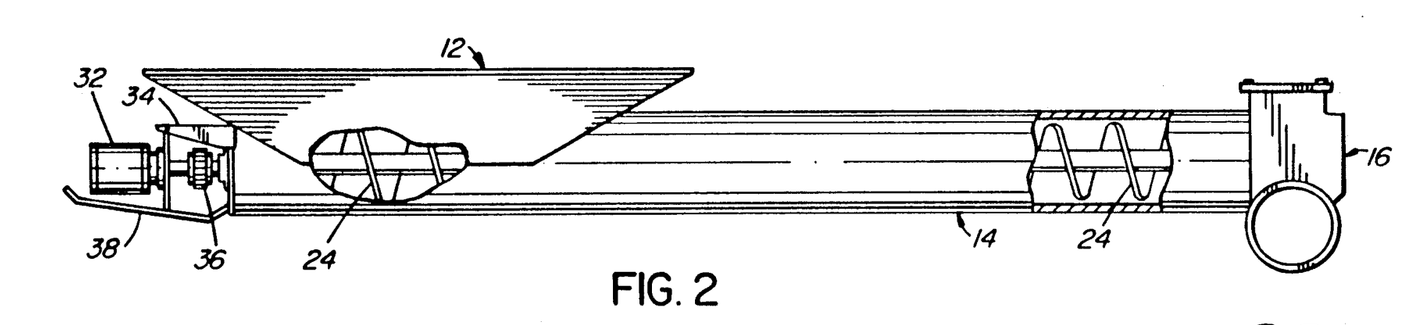
FIG. 2 is a side elevation view of the apparatus, certain portions of the same being cut away so as to show the internal feed auger.

The above-noted feed auger 24 is of a conventional design and extends from one end to the other of the feed tube 14. In order to drive the feed auger 24 in rotation, there is provided, at the hopper end of the feed tube 14, a hydraulic drive motor 32 of any suitable commercially available variety, this hydraulic motor 32 being secured to the end of the feed tube via a mounting bracket 34. The outlet drive shaft of the hydraulic motor is connected to the shaft of the feed auger 24 by way of a suitable flex coupling 36. A short skid 38 is also affixed to the hopper end of the feed tube 14 and extends below the hydraulic motor 32 both to protect the hydraulic motor and to allow the apparatus to be slid into position beneath a hopper bottom trailer or the like.

Figure 3:
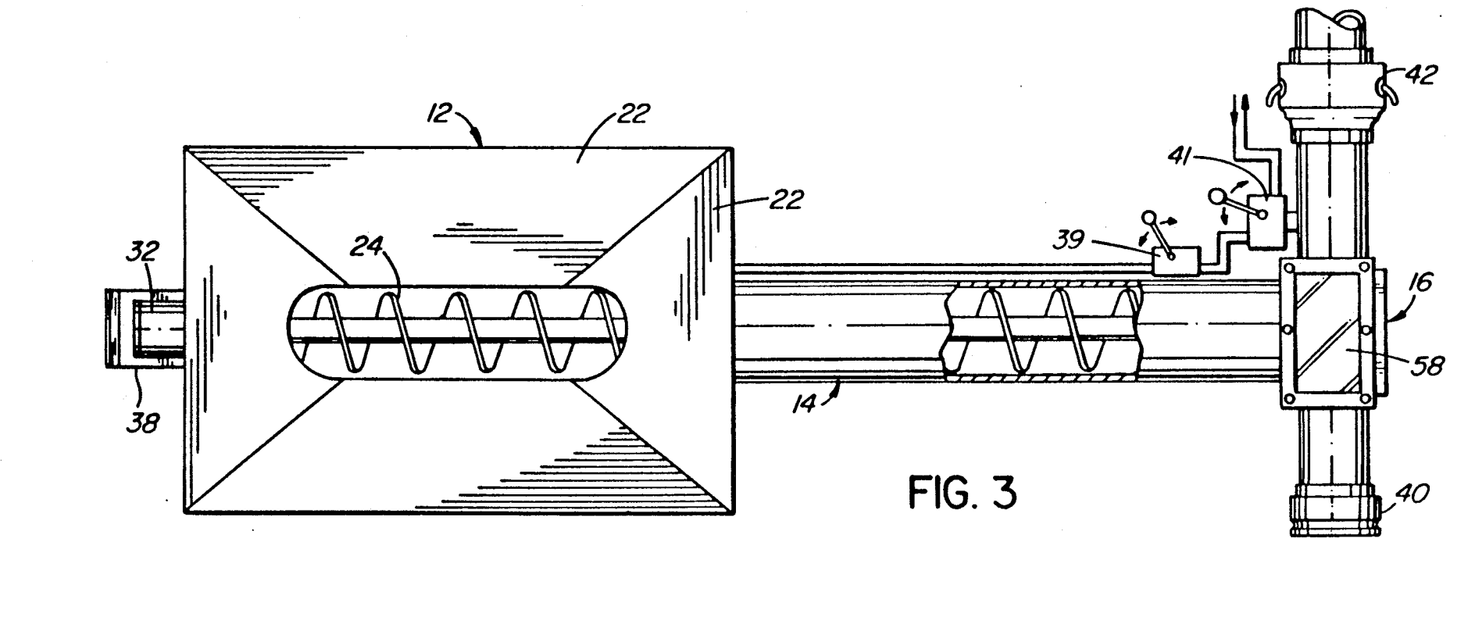
FIG. 3 is a top plan view of the apparatus, a portion of the feed tube being cut away to show the feed auger and the flow control assembly for the hopper having been removed so as to also show the feed auger.

With reference to FIG. 3, the hydraulic motor 32 is controlled by way of a control valve module 39 mounted by a suitable bracket to the fluidizing chamber 16. By means of this control valve 39, (which is of any suitable commercially available variety), the operator can start, stop and reverse the motor. To increase or decrease the rate of rotation of the hydraulic motor a flow control valve 41 is provided. These valves together enable the operator to exert a close degree of control on the rate at which the feed auger 24 conveys bulk material toward the fluidizing chamber 16 and enables the operator to take remedial action when appropriate.

As noted previously, the fluidizing chamber is provided with air line inlet 40 and air line outlet 42 which are connected to respective inlet and outlet air lines 18 and 20. The incoming and outgoing air lines are each provided with a semi-smooth bore thereby to reduce air friction and the air line inlet and outlet also are each preferably provided with couplers enabling quick connections to be made to the incoming and outgoing air lines. One suitable type of coupler is known as the "Cam-Lock" coupler which provides for quick attachment and detachment while at the same time providing a smooth internal bore so as to reduce air friction losses as well as providing a tight air seal at the point of connection.

Figure 5:
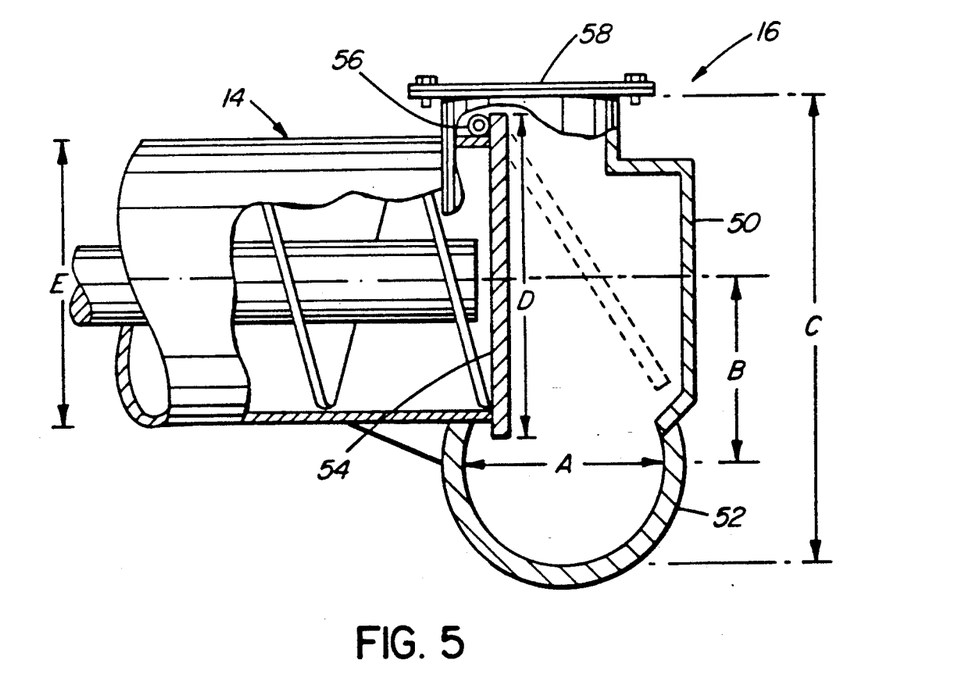
FIG. 5 is a partial section view through the fluidizing chamber showing the outlet end of the feed tube as well as open and closed positions of the gate within the fluidizing chamber.
Figure 6:
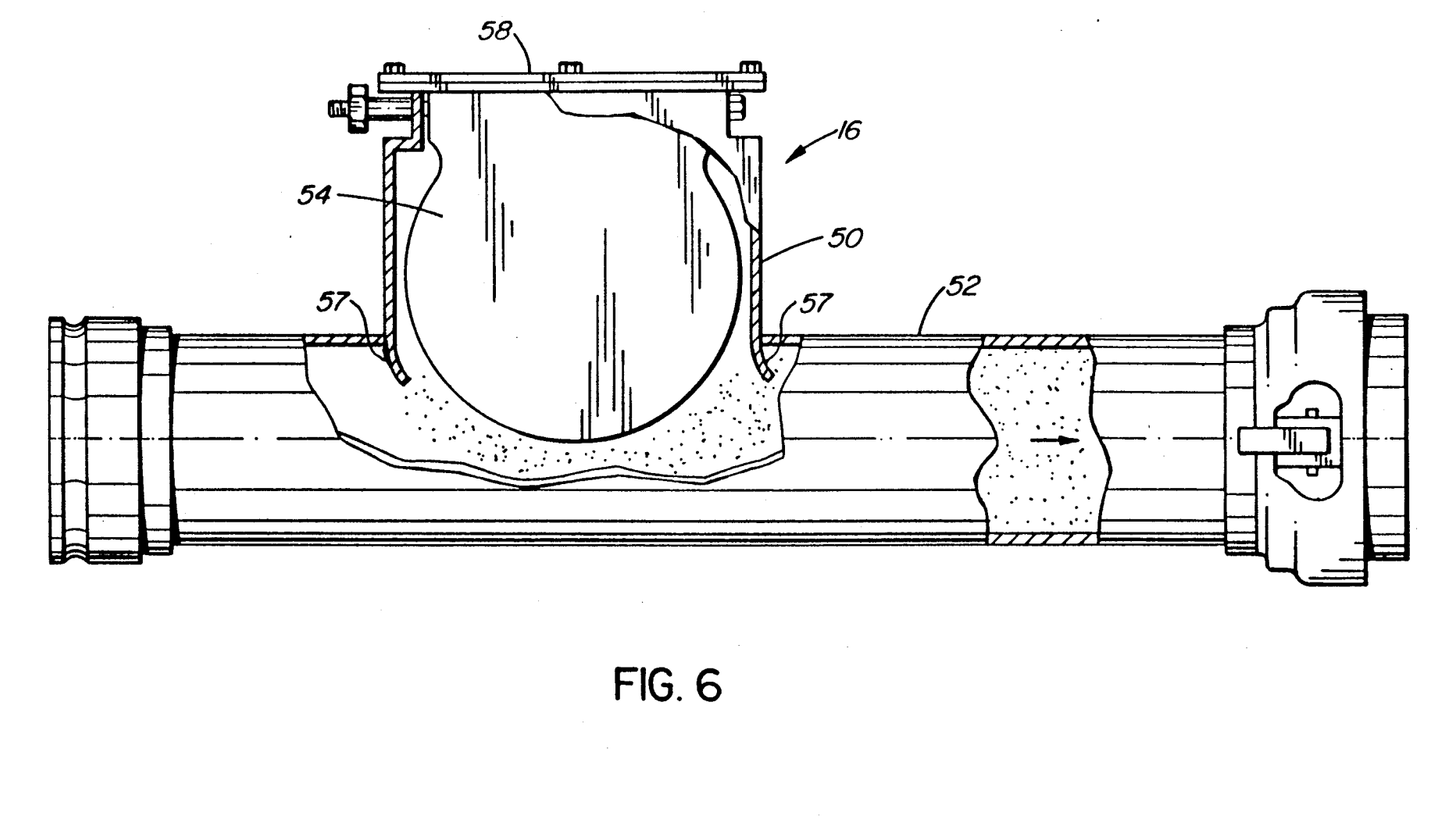
FIG. 6 is an end elevation view of the apparatus, a wall of the fluidizing chamber having been cut away so as to show the internal configuration including the outline configuration of the gate.

With particular reference to FIGS. 5 and 6, it will be seen that the fluidizing chamber 16 comprises a gate chamber 50 attached to and located above an air duct section 52. The air duct section comprises a tubular section having the above-noted air line inlet 40 and the air line outlet 42 disposed at opposing ends of same. The box-like gate chamber 50 is secured, as by welding, to the air duct section 52 and has its lower and portion opening into and freely communicating with the interior of the air duct section 52 as clearly illustrated in FIGS. 5 and 6.

It was previously noted that the feed tube 14 has its outlet end disposed within the fluidizing chamber 16. As shown in FIGS. 5 and 6, a gate 54 is located at the outlet end of the feed tube 14 within the fluidizing chamber 16 and is exposed, in use, to the airflow which passes through the fluidizing chamber from the air line inlet 40 to and through the air line outlet 42. This gate 54 is responsive to the opposing forces exerted thereon by the bulk material which is being forced through the feed tube 14 by the feed auger 24, and by the pressurized air within the fluidizing chamber. In operation this gate 54 acts to permit the flow of bulk material into the fluidizing chamber 16 while at the same time interacting with the bulk materials to prevent blow-back of pressurized air from the fluidizing chamber through the feed tube 14 and outwardly of the inlet hopper 12. In operation, the bulk material is compressed somewhat as the feed auger pushes the material against the inside surface of the gate thus forming a "plug" of moving material that interacts with the surrounding structures to prevent blow-back.

It will be seen with particular reference to FIGS. 5 and 6 that the air line inlet and the air line outlet 40, 42 are located in substantial alignment with one another along a first axis which extends lengthwise and is centered with the air duct section 52 of the fluidizing chamber. The feed tube 14 defines a further axis (which axis extends lengthwise of the feed tube and is centered with the rotation axis of the feed auger 24), such further axis being transversely arranged relative to the first axis noted above. The further axis defined by feed tube 14 is also displaced upwardly from the first axis in such a way that, during use, the bulk material exiting from the outlet end of the feed tube 14 falls downwardly under the influence of gravity and hence passes into and is fluidized by the air flow passing through the fluidizing chamber 16 along the first axis from the air line inlet 40 to the air line outlet 42.

The above-noted gate 54 comprises a flat plate of sufficient size as to butt up firmly against the inner end of the feed tube 14 when gate 54 is in its closed position. The gate is hinged adjacent its upper edge by way of hinge 56 fixed to the outlet end of the feed tube 14. Gate 54 can thus pivot from a closed position in close contacting relation to the outlet end of the feed tube 14 to and through a range of partially open positions. One such partially open position is illustrated in dashed lines in FIG. 5. During use, as noted previously, the incoming bulk material applies a force to one face of the gate 54 while the pressure of the air within the fluidizing chamber 16 applies a force to the opposing face of the gate.

By virtue of the structure as described above and illustrated in the drawings especially the relationship between the feed tube outlet and the air duct section of the fluidizing chamber, the bulk materials entering fluidizing chamber 16 fall downwardly by gravity from the outlet end of the feed tube 14 and almost immediately pass into a central region of maximum air flow velocity within the above-described air duct section 52 thus effecting substantially complete fluidization of the bulk material. The bulk material has almost no chance of lodging against and building up on any fixed surface from whence it could create gate closure or plugging problems. In this connection the small downwardly extending baffle portions 57 (see FIG. 6) located in flanking relation to the gate 54 are of assistance in establishing air current patterns which enhance the fluidization process.

It will also be noted that the abovedescribed gate 54 is disposed in the fluidizing chamber 16 in a manner such that, during use of the apparatus, a substantial lower portion of the gate (approximately one-quarter to one-third of it) is disposed within the region of maximum air flow velocity so that the resulting air currents tend to keep the gate surfaces clear of deposits which might otherwise tend to prevent full closure of the gate.

The upper or top face of the gate chamber 50 is provided with a viewing port 58, this viewing port typically including a sheet of "Plexiglass" material thus enabling the operator to observe conditions existing within the fluidizing chamber 16, particularly conditions in the immediate region of the gate 54. By manipulating the closely adjacent hydraulic flow control valve 41, the operator can control the rotation of the feed auger 24 in accordance with conditions as observed within the fluidizing chamber 16. This permits remedial action to be taken before a plugging condition actually occurs.

For the further guidance of those skilled in this art the following detailed example is set forth, it being realized that the invention is not to be limited to the details given but that reasonable modifications may be made by those skilled in this art.

EXAMPLE

With reference again to FIG. 5 some details for a typical embodiment are given below:

| DIMENSIONS: | |
|---|---|
| A  diameter of air duct section | 6.0 ins. |
| B  distance between LC of feed tube and LC of air duct section | 5.3 ins. |
| C  total height of fluidizing chamber | 13.4 ins. |
| D  total height of a gate | 9.3 ins. |
| E  diameter of feed tube | 8.0 ins. |
| AIR LINE: | |
| semi-smooth bore | 6 in. inside dia. |
| air line length (incoming & outgoing) "Cam-Lock" couplers-quick | 50 ft. approx. detach-tight seal smooth bore |
| BLOWER: Positive displacement | |
| lobe-type (make "Vana"; model RSBS) | 1100 cfm @ 6 p.s.i. output (this example) |
| MATERIAL: | |
| salt | |
| RATE OF CONVEYANCE: | |
| rate of flow | = 1 ton/minute approx. |

It will be realized by those skilled in this art in light of the foregoing description that the apparatus described herein is extremely versatile and capable of being utilized in an extremely wide variety of situations. The apparatus is extremely simple and, being portable, can be readily carried from one job site to another in a relatively small vehicle, which vehicle also carries the other related ancillary equipment such as the inlet and outlet air lines, the lobe blower, and the hydraulic pump supply lines and hydraulic reservoir and so on. It should also be realized that several of the devices as described may be used, each receiving bulk material from a different source to enable the blending of several fluent bulk materials to provide a specific blend, the several devices being linked together by a common conveying line and sharing a common blower. Numerous advantages will be readily apparent to those skilled in the art.

Preferred embodiments of the invention have been described by way of example. Those skilled in this art will realize that numerous modifications and modifications may be made while remaining within the scope of the invention. Accordingly, the invention is not to be limited to the embodiments described. For definitions of the invention reference is to be had to the appended claims.

What is claimed is:

1. Apparatus for introducing fluent bulk material into a pneumatic conveying line, comprising:

(a) a fluidizing chamber having an air line inlet and an air line outlet for connection to incoming and outgoing air lines respectively;

(b) a feed tube connected to said fluidizing chamber and having an outlet end disposed within said fluidizing chamber;

(c) an assembly for effecting movement of the bulk material through said feed tube from a source of supply into the interior of said fluidizing chamber so that the bulk material may, during use, be fluidized by an air flow passing through said fluidizing chamber from said air line to and through said air line outlet and carried therewith out through said air line outlet;

(d) a gate located at said outlet end of said feed tube within said fluidizing chamber and exposed, in use, to the air flow passing from the air line inlet to and through the air line outlet and responsive to opposing forces exerted thereon by the bulk material moving through said feed tube and the pressure of the air within said fluidizing chamber for permitting flow of the bulk material into said fluidizing chamber through said feed tube and at the same time preventing blow back of air from said fluidizing chamber through said feed tube, (e) said air line inlet and said air line outlet being located in substantial alignment with one another along a first axis and wherein said feed tube defines a further axis which is laterally arranged relative to the first axis and is displaced therefrom in such a manner that, during use, bulk material exiting the outlet end of said feed tube falls downwardly under the influence of gravity and passes into and is fluidized by the air flow passing through said fluidizing chamber along the first axis from said air line inlet to said air line outlet, (f) said gate being hinged adjacent its upper edge for movement from a closed position in close contacting relation to the outlet end of the feed tube to and through a range of partially open positions, and wherein (g) said fluidizing chamber comprises a gate chamber and an air duct section, said air duct section comprising a tubular section having said air line inlet and said air line outlet disposed at opposing ends thereof, and said gate chamber being secured to said air duct section and having a lower end portion opening into and freely communicating with the interior of the air duct section such that the bulk material falling downwardly by gravity from the end of said feed tube pass into a central region of maximum air flow velocity within said air duct section to effect the fluidization of the bulk material.

2. Apparatus according to claim 1 wherein said gate is disposed in said fluidizing chamber such that, during use, a substantial lower portion thereof is disposed within the region of maximum air flow velocity so that the resulting air currents tend to keep the gate clear of deposits which might otherwise tend to prevent full closure of the gate.

3. Apparatus according to claim 1 including a low profile inlet hopper connected to an inlet end of said feed tube to allow the hopper to be located below the outlet of a hopper bottom trailer or the like.

4. Apparatus according to claim 3 including inlet flow control means in said hopper to control the rate of flow of the bulk material into the feed tube and the means for effecting movement of the bulk material therethrough.

5. Apparatus for introducing fluent bulk material into a pneumatic conveying line, comprising:
   (a) a fluidizing chamber having an air line inlet and an air line outlet for connection to incoming and outgoing air lines respectively;
   (b) a feed tube connected to said fluidizing chamber and having an outlet end disposed within said fluidizing chamber;
   (c) an assembly for effecting movement of the bulk material through said feed tube from a source of supply into the interior of said fluidizing chamber so that the bulk material may, during use, be fluidized by an air flow passing through said fluidizing chamber from said air line inlet to and through said air line outlet and carried therewith out through said air line outlet;
   (d) a gate located at said outlet end of said feed tube within said fluidizing chamber and exposed, in use, to the air flow passing form the air line inlet to and through said air line outlet and responsive to opposing forces exerted thereon by the bulk material moving through the feed tube and the pressure of the air within said fluidizing chamber for permitting flow of the bulk material into said fluidizing chamber through said feed tube and at the same time preventing blow back of air from said fluidizing chamber through said feed tube,
   (e) a low profile inlet hopper connected to an inlet end of said feed tube to allow said hopper to be located below the outlet of a hopper bottom trailer,
   (f) inlet flow control means in said hopper to control the rate of flow of the bulk material into the feed tube and into said assembly for effecting movement of the bulk material therethrough, and wherein
   (g) said inlet hopper has said assembly for effecting movement of the bulk material located in a lower portion thereof and said inlet flow control means being disposed over said assembly for effecting movement to control and vary the rate of flow of bulk material from said inlet hopper toward said assembly for effecting movement.

6. Apparatus for introducing fluent bulk material into a pneumatic conveying line, comprising:
   (a) a fluidizing chamber having an air line inlet and an air line outlet for connection to incoming and outgoing air lines respectively;
   (b) a feed tube connected to said fluidizing chamber and having an outlet end disposed within said fluidizing chamber;
   (c) an assembly for effecting movement of the bulk material through said feed tube from a source of supply into the interior of said fluidizing chamber so that the bulk material may, during use, be fluidized by an air flow passing through said fluidizing chamber from said air line inlet to and through said air line outlet and carried therewith out through said air line outlet;
   (d) a gate located at said outlet end of said feed tube within said fluidizing chamber and exposed, in use, to the air flow passing from the air line inlet to and through the air line outlet and responsive to opposing forces exerted thereon by the bulk material moving through said feed tube and the pressure of the air within said fluidizing chamber for permitting flow of the bulk material into said fluidizing chamber through said feed tube and at the same time preventing blow back of air from said fluidizing chamber through said feed tube; wherein
   (e) said assembly for effecting movement of the bulk material through said feed tube includes a variable speed drive and means to control said drive, said fluidizing chamber having a viewing port therein above said gate, so that the operator can control the rate of movement through said feed tube in accordance with conditions as observed within the fluidizing chamber.

7. Apparatus according to claim 6 including a low profile inlet hopper connected to an inlet end of said feed tube to allow the hopper to be located below the outlet of a hopper bottom trailer.

8. Apparatus according to claim 7 wherein said inlet hopper has said assembly for effecting movement of the bulk material located in a lower portion thereof and said inlet flow control means being disposed over said assembly for effecting movement and having means to vary the rate of flow of material from the hopper toward said assembly for effecting movement.

9. Apparatus according to claim 6 wherein said air line inlet and said air line outlet are located in substantial alignment with one another along a first axis and wherein said feed tube defines a further axis which is laterally arranged relative to the first axis and is displaced therefrom in such a manner that, during use, bulk material exiting the outlet end of said feed tube falls downwardly under the influence of gravity and passes into and is fluidized by the air flow passing through said fluidizing chamber along the first axis from said air line inlet to said air line outlet.

10. Apparatus according to claim 9 wherein said gate is hinged adjacent its upper edge for movement from a closed position in close contacting relation to the outlet end of the feed tube to and through a range of partially open positions.

11. Apparatus according to claim 9 wherein said fluidizing chamber comprises a gate chamber and an air duct section, said air duct section comprising a tubular section having said air line inlet and air line outlet disposed at opposing ends thereof, and said gate chamber being secured to said air duct section and having a lower end portion opening into and freely communicating with the interior of said air duct section such that the bulk material falling downwardly by gravity from the end of said feed tube pass into a central region of maximum air flow velocity within said air duct section to effect the fluidization of the bulk material.

12. Apparatus according to claim 11 wherein said gate is disposed in said fluidizing chamber such that, during use, a substantial lower portion thereof is disposed within the region of maximum air flow velocity so that the resulting air currents tend to keep said gate clear of deposits which might otherwise tend to prevent full closure of said gate.

13. Apparatus for introducing fluent bulk materials into a pneumatic conveying line, comprising:
   (a) a fluidizing chamber having an air line inlet and an air line outlet for connection to incoming and outgoing air lines respectively;
   (b) a feed tube connected to said fluidizing chamber and having an outlet end disposed within said fluidizing chamber;
   (c) an assembly for effecting movement of the bulk material through said feed tube from a source of supply into the interior of said fluidizing chamber so that the bulk material may, during use, be fluidized by an air flow passing through said fluidizing chamber from said air line inlet to and through said air line outlet and carried therewith out through said air line outlet;
   (d) a gate located at said outlet end of said feed tube within said fluidizing chamber and exposed, in use, to the air flow passing from the air line inlet to and through the air line outlet and responsive to opposing forces exerted thereon by the bulk material moving through said feed tube and the pressure of the air within said fluidizing chamber for permitting flow of the bulk material into said fluidizing chamber through said feed tube and interacting with the bulk material to prevent blow back of air from said fluidizing chamber through said feed tube; and wherein
   (e) said fluidizing chamber comprises a gate chamber which contains said outlet end of said feed tube and an air duct section, said air duct section comprising a tubular section having said air line inlet and said air line outlet disposed at opposing ends thereof, said gate chamber being secured to and above said air duct section and having a lower end portion opening into and freely communicating with the interior of said air duct section and arranged such that bulk material moving into said gate chamber via said outlet end of said feed tube fall downwardly by gravity from said outlet end of said feed tube and pass directly into a central region of maximum air flow velocity within said air duct section to effect fluidization of the bulk material.

14. Apparatus according to claim 13 wherein said air line inlet and said air line outlet are located in substantial alignment with one another along a first axis extending along said air duct section and wherein said feed tube defines a further axis which is generally transversely arranged relative to the first axis and is displaced thereabove.

15. Apparatus according to claim 14 wherein said gate is hinged adjacent its upper edge for movement from a closed portion in close contacting relation to the outlet end of the feed tube to and through a range of partially open positions.

16. Apparatus according to claim 15 wherein said gate is disposed in said fluidizing chamber such that, during use, a substantial lower portion thereof is disposed within the region of maximum air flow velocity so that the resulting air currents sweep along said gate and tend to keep said gate clear of deposits which might otherwise tend to prevent full closure of said gate.

17. Apparatus according to claim 16 wherein said assembly for effecting movement of the bulk material through said feed tube includes a variable speed drive and means to control said drive, said fluidizing chamber having a viewing port therein above said gate, so that the operator can control the rate of movement through said feed tube in accordance with conditions as observed within said fluidizing chamber.

18. Apparatus according to claim 13 including a low profile inlet hopper connected to an inlet end of said feed tube to allow said hopper to be located below the outlet of a hopper bottom trailer or the like.

19. Apparatus according to claim 18 including inlet flow control means in said hopper to control the rate of flow of the bulk material into said feed tube and said assembly for effecting movement of the bulk material therethrough.

20. Apparatus according to claim 19 wherein said inlet hopper has said assembly for effecting the movement of the bulk material located in a lower portion thereof, and said inlet flow control means being disposed over said assembly for effecting movement to vary the rate of flow of material from said inlet hopper toward said assembly for effecting movement.

21. A conveying system comprising multiple apparati according to claim 13 each arranged to receive material from a different source of supply and being secured by their air inlets and outlets to a common pneumatic conveyance line and to a common blower to enable blending of several bulk materials together.

22. Apparatus according to claim 13 wherein said assembly for effecting movement of the bulk material through said feed tube includes a variable speed drive and means to control said drive, said fluidizing chamber having a viewing port therein above said gate, so that the operator can control the rate of movement through said feed tube in accordance with conditions as observed within said fluidizing chamber.

23. Apparatus according to claim 2 wherein the assembly for effecting movement of the bulk material through the feed tube includes a variable speed drive and means to control and drive, said fluidizing chamber having a viewing port therein above said gate, so that the operator can control the rate of movement through the feed tube in accordance with conditions as observed within the fluidizing chamber.

* * * * *

UNITED STATES PATENT AND TRADEMARK OFFICE
CERTIFICATE OF CORRECTION

PATENT NO. : 5,087,155
DATED : February 11, 1992
INVENTOR(S) : Herman et al

It is certified that error appears in the above-identified patent and that said Letters Patent is hereby corrected as shown below:

Col. 11, line 56, "closed portion" should be --closed position--.

Col. 12, line 51, "control and drive" should be --control said drive--.

Signed and Sealed this

Fourteenth Day of June, 1994

BRUCE LEHMAN

*Attest:*

*Attesting Officer*      Commissioner of Patents and Trademarks